R. STRONG.
TIRE CONSTRUCTION.
APPLICATION FILED MAY 7, 1914.
1,117,530.
Patented Nov. 17, 1914.
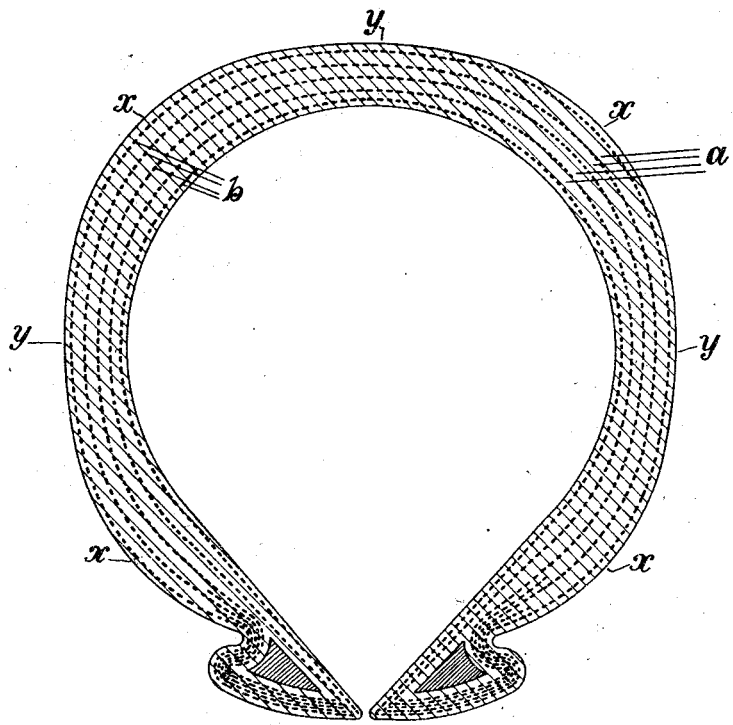

UNITED STATES PATENT OFFICE.

RIPLEY STRONG, OF YARNBOROUGH, ENGLAND.

TIRE CONSTRUCTION.

1,117,530.  Specification of Letters Patent.  Patented Nov. 17, 1914.

Application filed May 7, 1914. Serial No. 836,978.

*To all whom it may concern:*

Be it known that I, RIPLEY STRONG, residing at Yarnborough, Hampshire, England, have invented certain new and useful Improvements in Tire Construction; and I do hereby declare the following to be a full, clear, and exact description of the invention, such as will enable others skilled in the art to which it appertains to make and use the same.

This invention relates to the construction of the covers for pneumatic or other resilient tires which covers are built up of layers of canvas or other similar material held together by rubber or other similar material.

Hitherto the general practice has been to build up the casing or body of the cover with successive layers of rubber covered or rubber proofed canvas, only sufficient rubber being used in the covering or proofing to cause the canvas layers to adhere firmly together. The action that takes place in a cover constructed as just described when carrying a load is as follows:—The tire cover becomes flattened at the point in contact with the ground, the result of this deformation being that parts of the curved canvas wall become straightened while other parts become more curved. This result creates a very strong tendency for the canvas layers to slide one upon another which in time will lead to the destruction of the tire cover no matter how good the rubber cementing material that holds the layers together.

The object of my invention is not to prevent this movement, but to allow it to take place without injuring the tire cover.

The invention consists in placing layers of rubber between the layers of canvas or other fabric of such thickness as to allow of the necessary movement between the layers of canvas or other fabric without unduly straining the rubber. These layers of rubber extend over the whole surface of each layer of canvas or fabric and are arranged so that the rubber is thickest at those points where the movement between the layers of canvas or fabric is greatest and is thinnest at those points where the movement is least.

Referring to the drawing:—The figure shows in section a tire cover constructed in accordance with my improvements.

In the drawings, layers of rubber $a$ are placed between layers of canvas $b$. The thickness of the rubber as well as its quality will depend upon the thickness of canvas employed and the size of tire required, but the minimum effective thickness in any such construction is never less than $\frac{3}{4}$ of a mm., and may be increased as required, the thickness in each case being reckoned in the raw state. Since the object of this invention is to prevent the relative motion of the adjacent layers of fabric from having a destructive effect, it follows that these improvements apply to tire covers in which two or more layers of canvas exist in the carcass. This canvas or fabric while varying in quality and mesh to requirement is cut on the bias, so as to produce flexibility and the correct molding of such fabric to any required cover section. The rubber compound in the raw state may be applied to the canvas or vice versa, and these materials may be brought into close adherence the one to the other by any good known means, and by the employment of a solvent or not, as may be necessary.

The layers of rubber $a$ and canvas $b$ are applied all around the cover cross section, but over portions marked $x$ the thickness of the rubber insertion is increased, such increments in thickness tapering in each layer from the point $x$ toward the points marked $y$ which points $y$ are those whereat the relative fabric movement is least. The points $x$ are those wherein the relative fabric movement is greatest so that the adherent rubber coating will allow the canvas to move without disintegration or under heating taking place.

I claim:—

A tire cover, comprising a series of layers of elastic rubber and a series of layers of textile material arranged alternately and secured together, each intervening layer of elastic material having double tapered portions which are thinnest where they are intersected by planes drawn vertically and horizontally through the axis of the tire, said double tapered portions being arranged to extend circumferentially of the tire and being extensible and contractible in proportion to the relative movements of the corresponding portions of the layers of textile material.

In testimony whereof I affix my signature, in the presence of two witnesses.

RIPLEY STRONG.

Witnesses:
HERBERT D. JAMESON,
L. H. ROGERS.